United States Patent [19]
Hansen

[11] Patent Number: 5,813,286
[45] Date of Patent: Sep. 29, 1998

[54] SUPPORT ARM

[76] Inventor: Henning Hansen, 1470 Highbush Trail, Pickering, Canada, L1V 1N5

[21] Appl. No.: 628,243

[22] Filed: Apr. 4, 1996

[51] Int. Cl.$^6$ .............................. B25J 11/00; B25J 17/00
[52] U.S. Cl. ................................ 74/490.02; 74/490.05; 248/276.1; 248/278.1; 285/118; 285/907; 414/918; 901/28
[58] Field of Search ......................... 74/490.02, 490.05; 248/276.1, 278.1, 282.1, 284.1; 285/118, 163, 181, 137.1, 136, 184, 907; 414/918; 901/28, 29

[56] References Cited

U.S. PATENT DOCUMENTS

| | | | |
|---|---|---|---|
| 1,270,940 | 7/1918 | Godley | 285/907 X |
| 1,425,011 | 8/1922 | Herron | 285/907 X |
| 1,857,847 | 5/1932 | Heinemann | 285/181 |
| 2,458,967 | 1/1949 | Wiedenhoeft | 285/907 |
| 3,072,374 | 1/1963 | Bodian | 248/278.1 |
| 4,685,349 | 8/1987 | Wada et al. | 74/479 |
| 4,708,312 | 11/1987 | Rohr | 248/280.1 |
| 5,086,206 | 2/1992 | Hansen | 219/125.1 |

FOREIGN PATENT DOCUMENTS

| | | | |
|---|---|---|---|
| 1-306193 | 12/1989 | Japan | 414/918 |
| 4-111795 | 4/1992 | Japan | 414/918 |
| 1565674 | 5/1990 | U.S.S.R. | 414/918 |

*Primary Examiner*—Allan D. Herrmann
*Attorney, Agent, or Firm*—Ridout & Maybee

[57] ABSTRACT

A support arm has stationary support structure, a boom, a knuckle and an auxiliary jib section. The boom connects at one end to the support structure and at an opposite end to one end of the knuckle, and an opposite end of the knuckle connects to one end of the auxiliary jib section. Each connection is a pivotal connection for pivoting about vertical pivot axes. An opposite end of the auxiliary jib section connects to a main jib section through a pivotal connection for pivoting about a horizontal axis. First and second flexible tubes connect across the knuckle and the auxiliary jib section between the boom and the main jib section. The flexible tubes extend from points on the main jib section in parallel horizontally spaced relationship and pass slippingly and in parallel longitudinally through parallel horizontally spaced guide sleeves that are connected on the auxiliary jib section. In the region of the knuckle the flexible tubes converge and cross over one another in a loosely curved configuration toward horizontally spaced points on the opposite end of the boom. A drive adjusts the elevation of the main jib section by pivoting it about the horizontal pivot axis, between an upper position parallel to the boom and a lower position inclined downwardly thereto. This arrangement allows vertical rise and fall of the main jib section and pivoting of the jib horizontally relative to the boom.

7 Claims, 4 Drawing Sheets

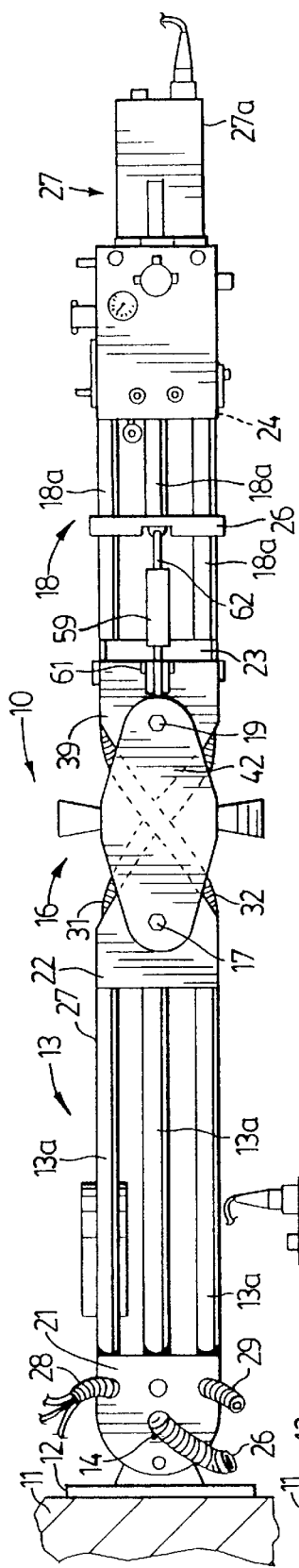
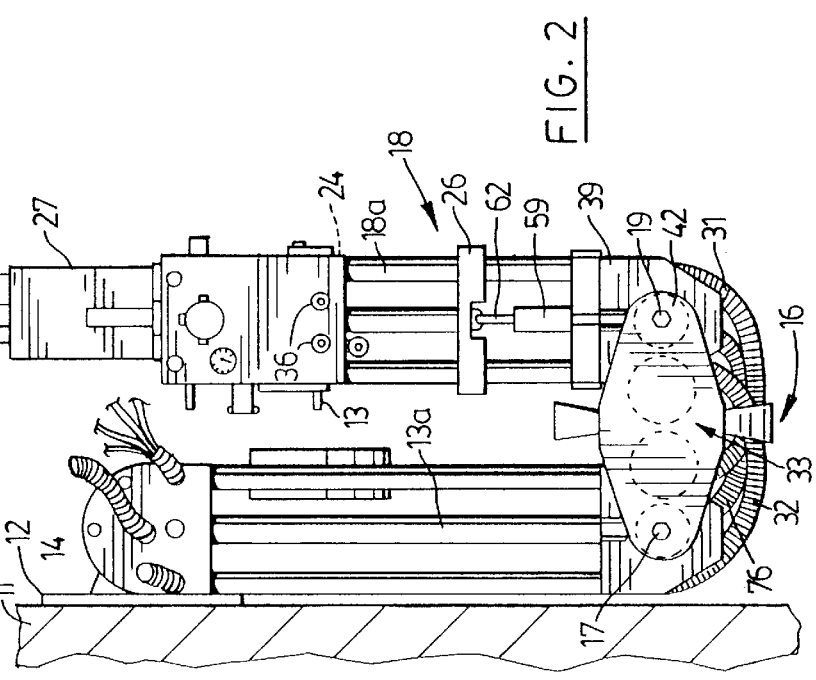
FIG. 1
FIG. 2

SUPPORT ARM

BACKGROUND OF THE INVENTION

The present invention relates to an improved support arm. More especially, the improved support arm of the present invention includes a section that is pivotable about a horizontal axis between raised and lowered positions. The arm of the invention is therefore well adapted to be supported at considerably greater elevation than known support arms while still allowing access to be had to a load carried at the end of the arm by pivoting the section above-mentioned to a lowered position.

Usually, however, it is desired to provide flexible tubes running longitudinally through articulated sections of the support arm, for example for the purpose of providing fluid pressure or vacuum services at the load end of the arm. When the support arm is provided with a section that can be raised and lowered about a pivotal axis, the flexible tubes tend to be exposed to wear and damage as a result of binding, catching or rubbing wear on the rigid articulated elements of the support arm.

SUMMARY OF THE INVENTION

In the present invention there is provided a support arm comprising stationary support structure, a boom, a knuckle and an auxiliary jib section, said boom connected at one end to the support structure and at an opposite end to one end of the knuckle, and an opposite end of the knuckle to one end of the auxiliary jib section each through pivotal connections for pivoting about respective vertical pivot axes, an opposite end of the auxiliary jib section being connected to a main jib section through a pivotal connection for pivoting about a horizontal axis, first and second flexible tubes connecting across the knuckle and the auxiliary jib section between the boom and the main jib section, and wherein the flexible tubes extend from points on the main jib section in parallel horizontally spaced relationship and passing slippingly and in parallel longitudinally through parallel horizontally spaced guide sleeves connected on the auxiliary jib section and in the region of the knuckle converging and crossing one over the other in loosely curved configuration toward horizontally spaced points on said opposite end of the boom, and means for adjusting the elevation of the main jib section by pivoting it about said horizontal pivot axis, between an upper position parallel to the boom and a lower position inclined downwardly thereto.

With this arrangement, the portions of the flexible tube extending through the knuckle and through at least a major portion of the guide sleeves remain at a substantially constant horizontal level regardless of the elevation of the main jib section and regardless of the angle of the auxiliary jib section to the knuckle. Extension or retraction of the flexible tubes concomitant on lowering or raising of the main jib section, respectively, is accommodated by some straightening out and tautening of the loosely curved portions of the flexible tubes on lowering of the main jib section and re-adoption of the loosely curved configuration on raising of the main jib section, respectively.

In a preferred form, the above mentioned horizontal pivot axis is positioned so that it is adjacent the points on the main jib section from which the flexible tubes extend, at least at the upper position of the main jib section. With this arrangement, the portions of the flexible tubes adjacent the main jib section tend to be raised upwardly slightly relative to the guide sleeves as the main jib section is lowered, so that free slipping of the flexible tubes through the guide sleeves is facilitated.

BRIEF DESCRIPTION OF THE DRAWINGS

The present invention is more fully described with reference to the accompanying drawings, by way of example only.

FIG. 1 is a bottom plan view of an improved support arm in an out stretched configuration.

FIG. 2 is a bottom plan view of the arm in folded configuration.

DESCRIPTION OF THE EMBODIMENTS

Figure 3:
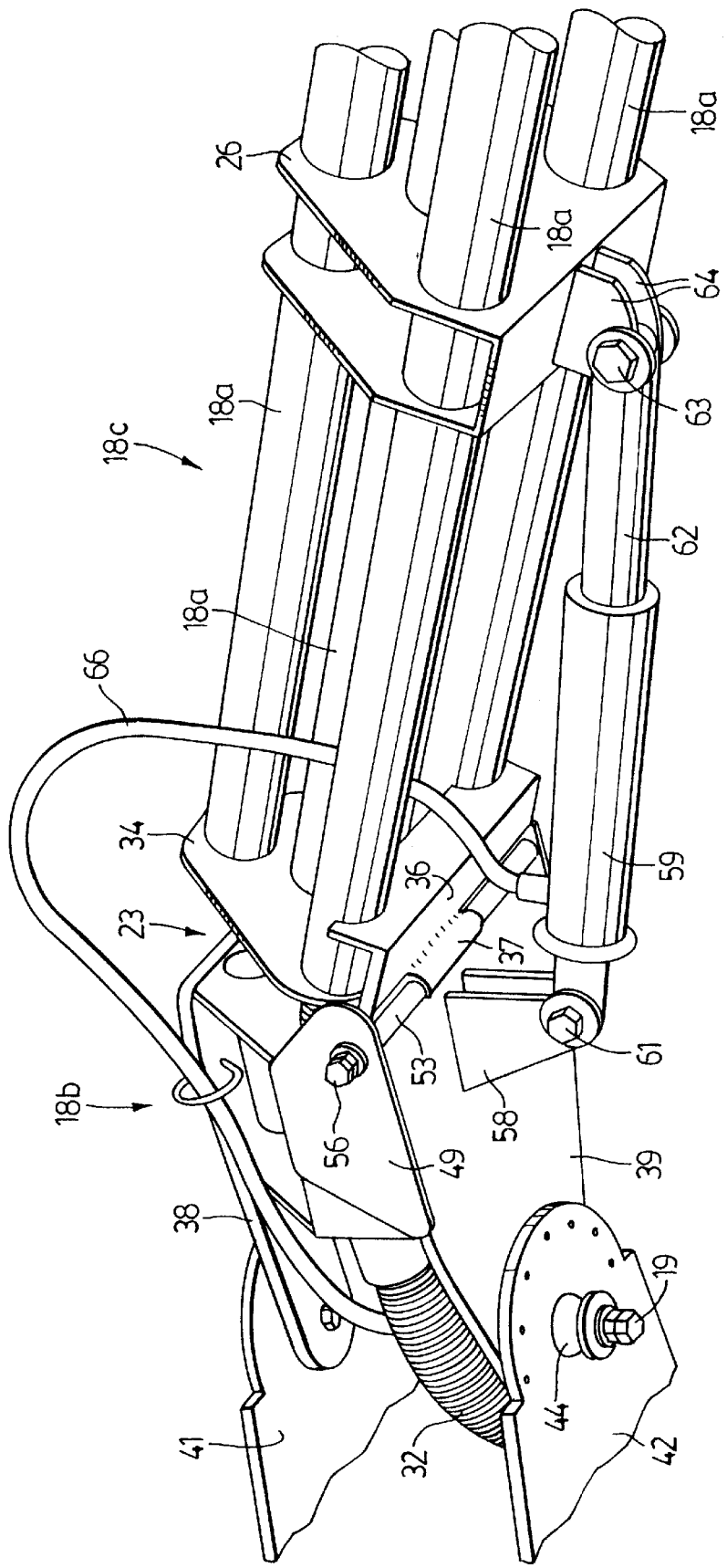
FIG. 3 is a partial perspective view from underneath of a hinge portion of the arm.

Referring to the drawings, wherein like reference numerals indicate like parts, FIG. 1 shows an arm 10 mounted on a vertical support surface such as a wall 11. A mounting bracket 12 is secured to the wall. The arm 10 comprises a boom 13 pivotally connected to the bracket 12 for example at 14 to pivot about a vertical pivot axis, a knuckle 16 pivoted to the boom 13 at 17 to pivot about a vertical axis and a jib 18 pivoted to the knuckle 16 at 19 to pivot about a vertical pivot axis.

The structure and operation of the boom, jib and knuckle is described in more detail in applicant's U.S. Pat. Nos. 5,025,126 and 5,086,206, the disclosures of each of which are incorporated herein by reference.

Briefly, each of the boom 13 and jib 18 consist of sets of rigid usually steel tubes disposed longitudinally parallel with one another, such tubes being indicated at 13a for the boom 13 and 18a for the jib 18 in the accompanying drawings. The tubes are held in spaced relationship to one another to form a rigid open framework by being secured, for example by welding, to rigid end members 21, 22, 23 and 24 including generally plate form portions extending at right angles to the tubes and having circular openings through which the tubes pass.

In the preferred form, the jib 18 comprises an intermediate apertured spacer member 26 again secured to the external surfaces of the tubes 18a, for example by welding.

The boom and jib of the support arm as shown preferably each comprise a set of four of the parallel rigid tubes. As best seen in FIG. 3, three of the tubes have their axes substantially at the corners of an equilateral triangle and the fourth tube has its axis substantially at the center of the equilateral triangle.

Figure 5:
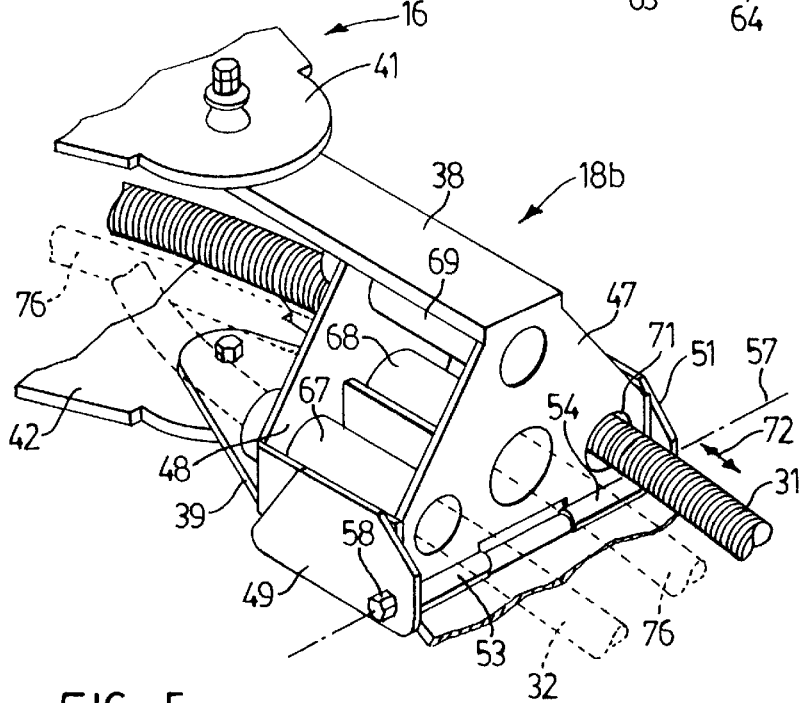
FIG. 5 is a partial perspective view from above of the hinge portion.

The tube 13a and 18a provide at least partially encased access channels for conveying fluids and the like between the support end of the support arm, that is to say the rearward end of the boom 13 and the load end of the support arm, that is to say the free end of the jib 18. For example, as described in more detail in applicant's above mentioned U.S. patents, the load end 27 of the arm may carry welding service equipment 27a. The tubes 13a and 18a are used as part of a fluid flow path. For example, the tubes may be used as a conduit along which a vacuum, dust extraction and/or fume extraction services are provided to the load end 27 of the arm. For this purpose, the two lower tubes of the sets of tubes 13a and 18a are preferably employed. A flexible tube 28 at the support end may connect to a vacuum apparatus (not shown) such as a centrifugal cyclone precipitator. The other end of the flexible tube 28 connects through a sealing end cap to the adjacent or support end of one of the lower tubes 13a. Similarly, a flexible conduit 29 may connect to a fume extraction device, such as a blower and filter assembly (not shown). The other end of the tube 29 connects sealingly through an end cap to the adjacent end of the other of the two lower tubes 13a. The opposite ends of the tubes 13a adjacent the knuckle 16 connect sealingly through end caps to a pair of flexible hoses 31 and 32. As described in applicant's above mentioned U.S. patents, and as shown in FIGS. 1, 2 and 5, these hoses 31 and 32 cross over one another within the knuckle 16 and then connect sealingly through end caps with the lower pair of tubes 18a. Adjacent the load end 27, the tubes 18a communicate to the vacuum and fume extraction service portions respectively of the welding service device 27a or the like. As discussed in applicant's above mentioned U.S. patents, by having the hoses 31 and 32 cross over in a loosely curved configuration within the knuckle 16, when the jib 18 is pivoted in a horizontal plane relative to the boom 13, for example as in the folded configuration shown in FIG. 2, the curved portions of the flexible tubes 31 and 32 arch laterally to accommodate such pivoting without subjecting the tubes to undue deformations or stresses.

Figure 4:
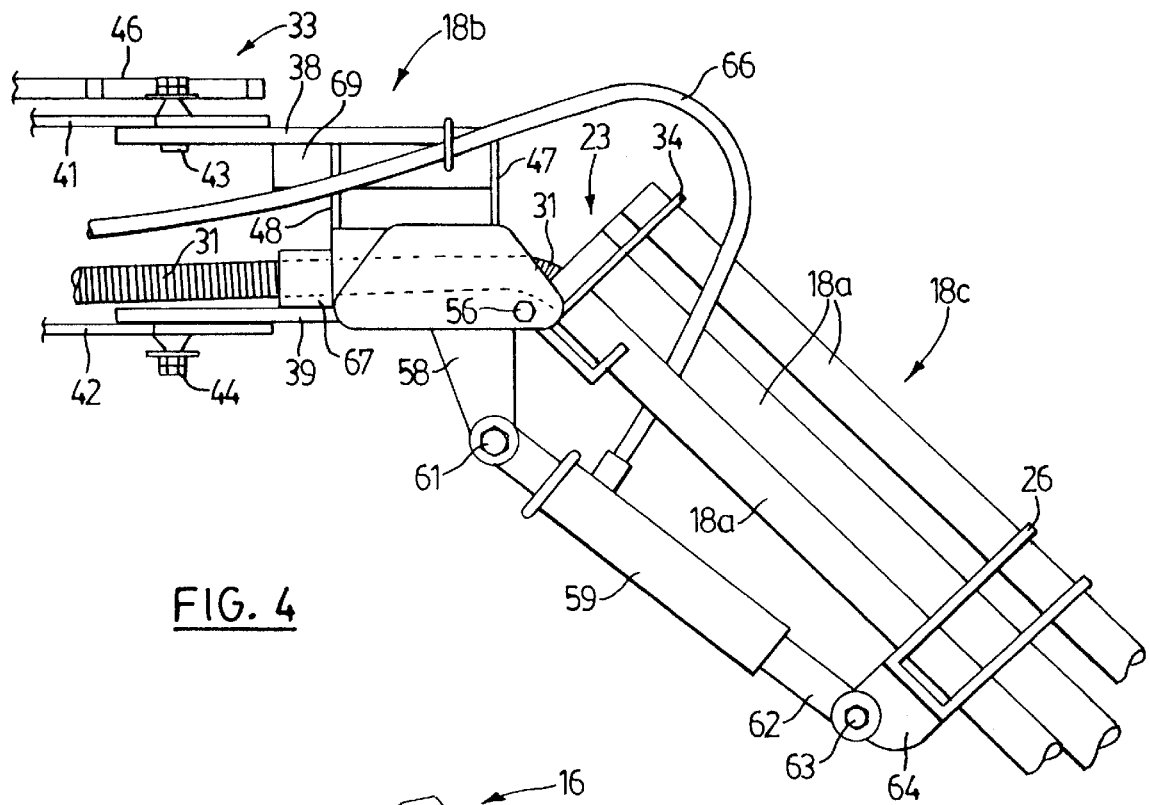
FIG. 4 is a side view of the hinge portion.
Figure 6:
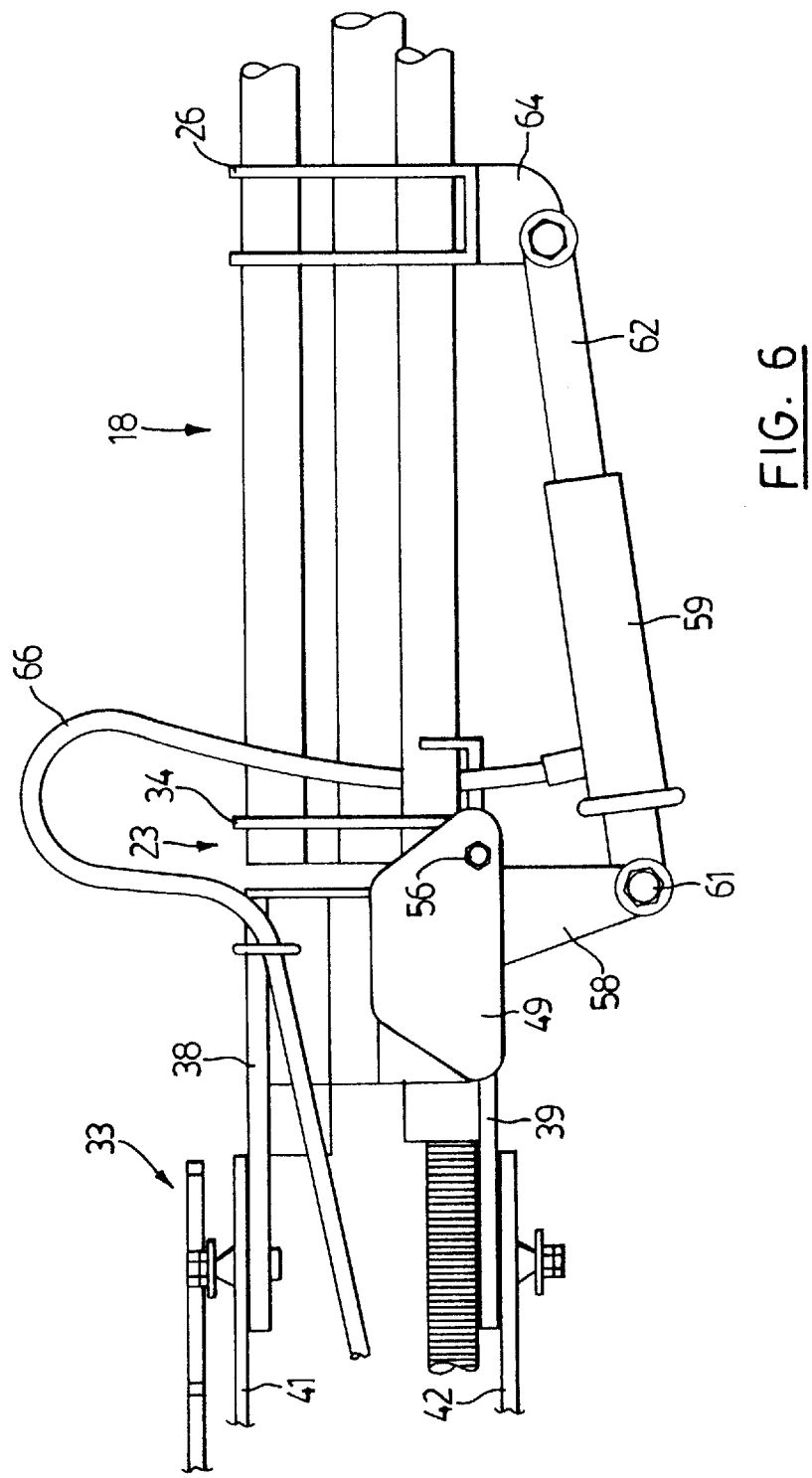
FIG. 6 is a side view corresponding to FIG. 4, showing the arm in elevated condition.

In the preferred form, the boom 13 and jib 18 are connected through an equiangular drive, for example a gear train 33 as indicated in FIGS. 2, 4 and 6 described in more detail in applicant's U.S. Pat. No. 5,086,206, that maintain the jib and boom each at the same angle to the longitudinal axis of the knuckle 16, that is to say the axis extending between the pivot point 17 and 19, so that uncontrolled movements of the knuckle relative to the boom or jib tending to pinch or deform the flexible tubes 31 and 32 are avoided.

In the present invention, in order to provide a vertical rise and fall function to the support arm, the jib 18 is formed in two sections, namely auxiliary and main sections 18b and 18c, respectively. The main jib section 18c comprises the rigid horizontal tubes 18a described above, the tubes 18a at the end adjacent the auxiliary section 18b passing through and being secured in a rigid plate-like end fitting 34 as seen in FIGS. 3, 4 and 6 and forming part of the rigid end member 23. A lower portion of the end member 23 comprises a lower transversely extending plate 36 to the lower side of which a laterally extending cylindrical hinge sleeve 37 is secured.

The auxiliary jib section 18b comprises vertically spaced horizontally extending upper and lower plates 38 and 39 pivotally connected to upper and lower plate portions 41 and 42, respectively of the knuckle 16 through pivot axles 43 and 44. The upper plate 38 may be keyed to the lower end of the axle 43 and the upper end of the axle 43 keyed to a spur gear 46 forming part of the gear train 33 above referred to.

The horizontal plates 38 and 39 are interconnected by a pair of generally triangular vertical spaced transverse plates 47 and 48. The plates 47 and 48 are further interconnected by longitudinally extending vertical cheek portions 49 and 51 between which extends a transversely extending pin forming a hinge pin for a hinge connection between the auxiliary and main sections 18b and 18c. The pin passes through the sleeve 37 attached to the lower plate portion 36, and through similar cylindrical sleeves 53 and 54 secured to a lower front edge of the forward plate 47. The ends of the pin are located, such as by a head, a nut, a clip or other locating device 56 on the outer flank of the cheek portions 49 and 51. This hinge arrangement allows for hinging of the main jib portion 18c about a horizontal axis 57 indicated in FIG. 5.

A drive is connected between the auxiliary jib portion 18b and the main jib portion 18c for raising and lowering the main jib portion 18c. Various forms of drive may, of course, be employed. In the example illustrated, a fluid operated piston and cylinder arrangement is employed, for example a hydraulic jack. A yoke portion 58 extends downwardly from the lower plate 39 of the auxiliary jib section 18b and a cylinder 59 of the hydraulic jack is connected pivotally to a lower portion of the yoke 58 at 61. The piston rod 62 of the jack is connected pivotally at 63 to a paid of spaced cheek portions 64 extending downwardly from the intermediate rigid spacer member 26.

A pressurized fluid supply line 66 connects to the cylinder 59 for actuation of the jack in the conventional manner. In the stored or horizontal position shown in FIGS. 1, 2 and 6, the arm may extend at a considerable elevation above the ground surface at which it would be inaccessible to an operator of ordinary height. A control device for controlling a pressure source and valving in conventional manner for actuating the jack is therefore preferably provided at ground level, for example is suspended from a control cable for ease of access by the operator.

In use, when the operator wishes to have access to the welding supply service equipment or other load 27a, the control is actuated to release fluid from the cylinder 59 along the line 66 so that the main jib section 18c pivots downwardly about the axis 57 to the lowered position seen in FIGS. 3 and 4. In this position, the load 27a or load end 27 of the support arm 10 is at a height at which it can be readily grasped by the operator. The arm is then readily manually pivotable about the vertical pivot axes 14, 17 and 19, so that the load 27a may then be positioned at any desired point within the semi-circular area described by rotation of the support arm 10 about the vertical pivot axis 14. The control device can be operated to actuate the jack to retract the piston 62 relative to the cylinder 59 and rock the jib section 18c upwardly to the FIG. 6 position once access is no longer desired to be had to the load end 27, in order to restore the jib to an elevated or stored position. The jack may include conventional limit switches to limit travel of the piston 62 and rocking motion of the jib section 18c between certain limits to avoid stressing the arm structures.

The auxiliary jib section 18b is provided with a series of cylindrical guide sleeves 67, 68, 69 and 71 that, in the elevated or horizontal position of the support arm as seen in FIG. 6 are aligned with the tubes 18a of the main jib section 18c. The sleeves 67 to 71 pass through apertures in the vertical plates 47 and 48, and are secured thereto by welding. Preferably, the sleeves 67 to 71 extend rearwardly to adjacent the knuckle 16. As seen in FIG. 5, the flexible hoses 31 and 32 extend through the two lower most guide sleeves 67 and 71. In FIG. 5, one flexible hose 32 is shown in broken lines for improved clarify of illustration. The internal diameter of the guide sleeves 67 to 71 is substantially larger than the diameter of the flexible hoses such as hoses 31 and 32 which pass through the sleeves. For example, the sleeves may be 10 to 50% greater in diameter than the flexible hoses, based on the diameter of the flexible hoses. More preferably, the sleeves are 15 to 40% greater in diameter. As a result, the flexible hoses tend to slip freely longitudinally through the guide sleeves, as indicated by the arrow 72 in FIG. 5. It may be noted that the flexible tubes 31 and 32 extend from the end caps through which they connect to the lower pair of rigid tubes 18a rearwardly toward the guide tubes 69 and 71 in parallel horizontally spaced relationship and continue in parallel through the tubes 67 and 71. Rearwardly toward the knuckle 16 as seen in FIGS. 1 and 5, the tubes 31 and 32 converge toward one another and cross over within the knuckle 16, in order to accommodate pivotal movement of the jib and boom relative to one another as discussed above. In use, when the main jib section 18c drops downwardly relative to the auxiliary jib section 18b as seen in FIG. 4, the tubes 31 and 32 extend and slip outwardly through the guide sleeves 67 and 71, and this extension is accommodated by the somewhat loosely curved portions of the tubes 31 and 32 within the knuckle 16, as seen in FIG. 1, straightening out somewhat and elongating to some extent. The tubes have a certain amount of elastic resiliency, and therefore tend to elongate under longitudinal tension. It will be appreciated that the crossed over configuration of the tubes 31 and 32 within the knuckle 16 is generally preserved on lowering of the jib section 18c to the position shown in FIG. 4, regardless of the angle of the jib 18 relative to the boom 13, since the guide tubes 67 and 71 maintain the flexible tubes 31 and 32 in the desired configuration during the lowering of the jib section 18c.

In the preferred form, as seen in FIGS. 4 and 6, the pivot axis 57, at least in the upper or elevated position of the jib section 18c shown in FIG. 6 has the guide sleeve and the tubes 18a disposed upwardly above it. Preferably, the pivot axis 57 is vertically adjacent the points at the rear of the tubes 18a from which the hoses 31 and 32 extend. The flexible tubes 31 and 32 have some degree of stiffness and, as the jib 18 drops downwardly to the position of FIG. 4, the portions of the tubes vertically adjacent the pivot axis, and adjacent the rearward ends of the tubes 18a, which tend to act as stiff rearward extensions of the tubes 18a, pivot upwardly away from the pivot axis 56, and therefore the lower sides of the tubes 31 and 32 tends to lift upwardly from the lower inner surface of the guide sleeves 67 and 71, as seen in FIG. 4, so that free slipping of the flexible tubes 31 and 32 through the guide sleeve 67 and 71 is facilitated.

As indicated in FIG. 5, the support arm may include a further flexible and resiliently elastic conduit 76 shown in broken lines extending from the support end of the arm 10 to the load end 27. In the preferred form, this flexible conduit 76 is anchored adjacent the support end of the arm 10 adjacent the support surface 11, and extends continuously through the central tubes 13a and 18a (at the center of the equilateral triangular formation) which are made of somewhat larger diameter, through the knuckle 16 and the central guide sleeve 68 and is anchored at the other end in the load 27a. On downward inclination of the auxiliary jib portion 18c, to the position shown in FIG. 4, the tube 76 slips longitudinally forwardly through the guide tube 68, the tube 76 elongating along its entire length as a result of the increase in tension in the tube on downward pivoting of the jib section 18c to the FIG. 4 position.

Similarly, the support arm may include a fourth flexible and elastic tube connecting between the support or rear end of the arm 10 and the load end and passing through the upper most of the tubes 13a and 18a and through the guides sleeve 69.

I claim:

1. A support arm comprising stationary support structure, a boom, a knuckle and an auxiliary jib section, said boom connected at one end to the support structure and at an opposite end to one end of the knuckle, and an opposite end of the knuckle to one end of the auxiliary jib section each through pivotal connections for pivoting about respective vertical pivot axes, an opposite end of the auxiliary jib section being connected to a main jib section through a pivotal connection for pivoting about a horizontal axis, first and second flexible tubes connecting across the knuckle and the auxiliary jib section between the boom and the main jib section, and wherein the flexible tubes extend from points on the main jib section in parallel horizontally spaced relationship and passing slippingly and in parallel longitudinally through parallel horizontally spaced guide sleeves connected on the auxiliary jib section and in the region of the knuckle converging and crossing one over the other in loosely curved configuration toward horizontally spaced points on said opposite end of the boom, and means for adjusting the elevation of the main jib section by pivoting it about said horizontal pivot axis, between an upper position parallel to the boom and a lower position inclined downwardly thereto.

2. An arm a s claimed in claim 1 wherein said flexible tubes are each fixed at one end to said opposite end of the boom and at the other end to the main jib section.

3. An arm as claimed in claim 1 wherein said horizontal pivot axis is below and adjacent the points on the main jib section from which the flexible tubes extend in the upper position of the main jib section.

4. An arm as claimed in claim 1 wherein the means for adjusting comprise a fluid operated piston cylinder connected between the auxiliary and main jib sections.

5. An arm as claim 1 wherein said boom and main jib section comprise parallel rigid tubes that are in sealed fluid communication with said flexible tubes.

6. An arm as claimed in claim 1 wherein said guide sleeves have an internal diameter substantially larger than the outside diameter of the flexible tubes.

7. An arm as claimed in claim 1 including an equiangular drive between the auxiliary jib section and boom maintaining each at the same angle to the longitudinal axis of the knuckle.

* * * * *